April 10, 1973  A. MARZOCCHI ET AL  3,726,753
METHOD OF PRODUCING SHEET MATERIAL
Original Filed April 30, 1965  5 Sheets-Sheet 2
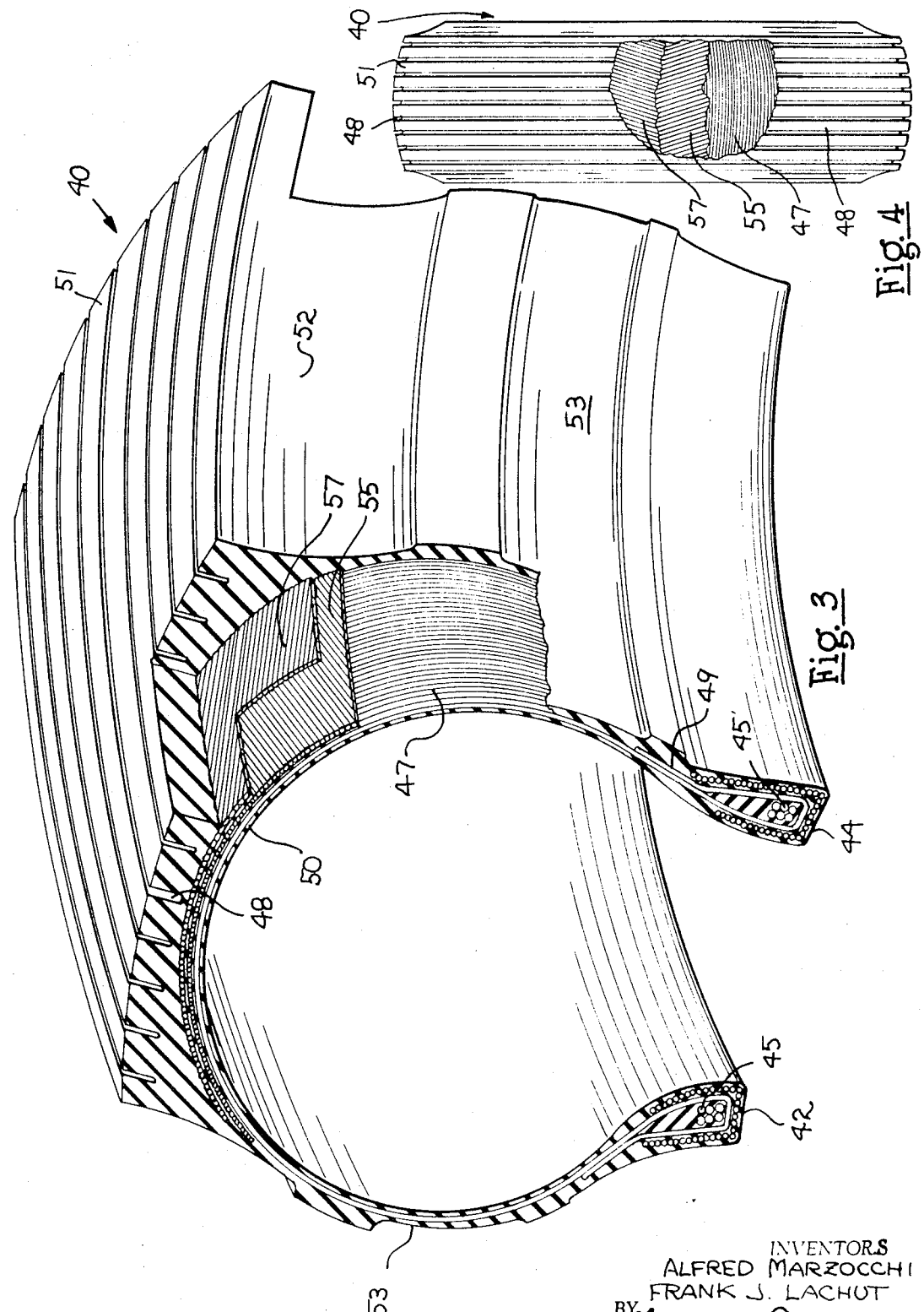
INVENTORS
ALFRED MARZOCCHI
FRANK J. LACHUT
BY
ATTORNEYS

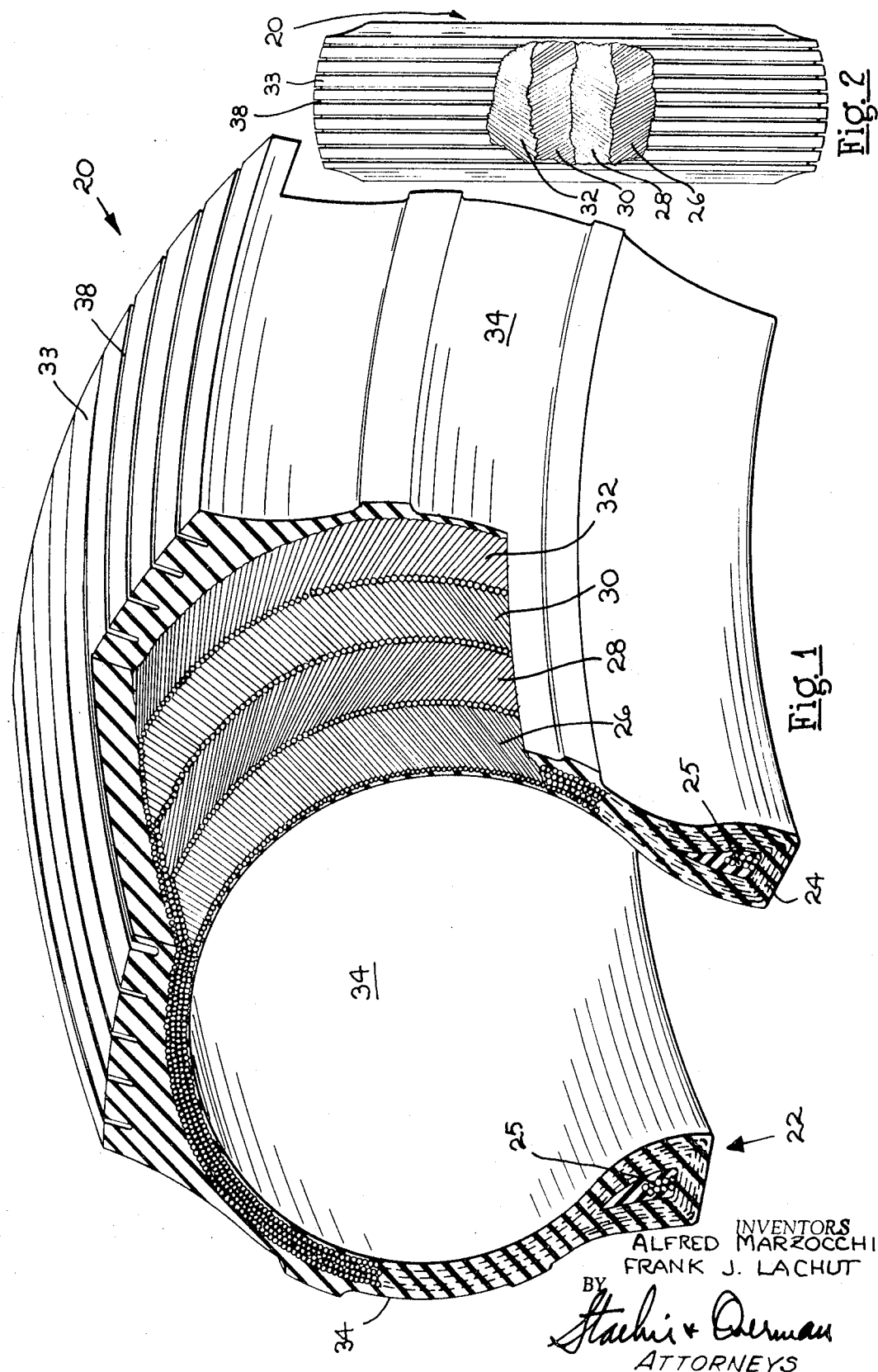

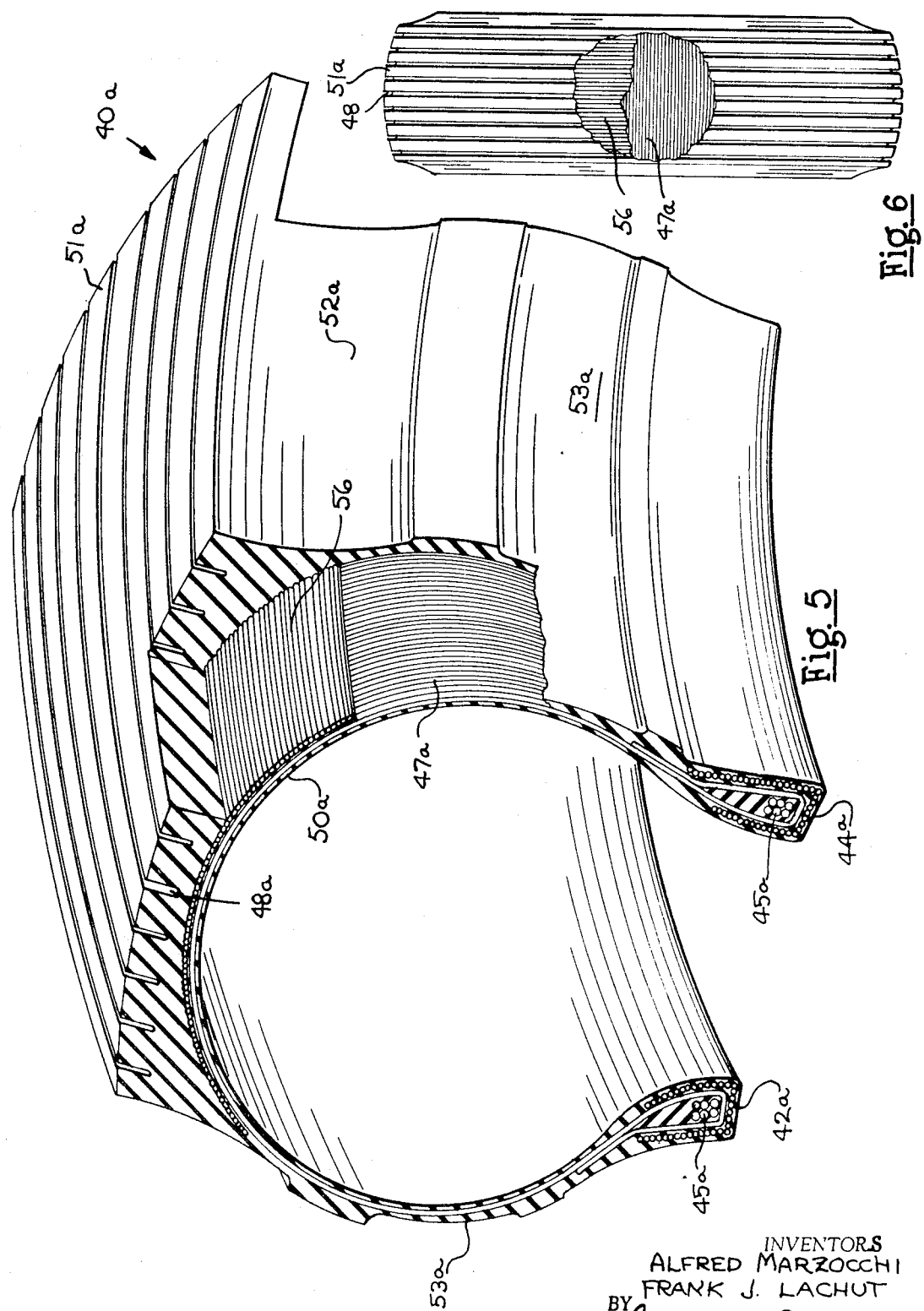

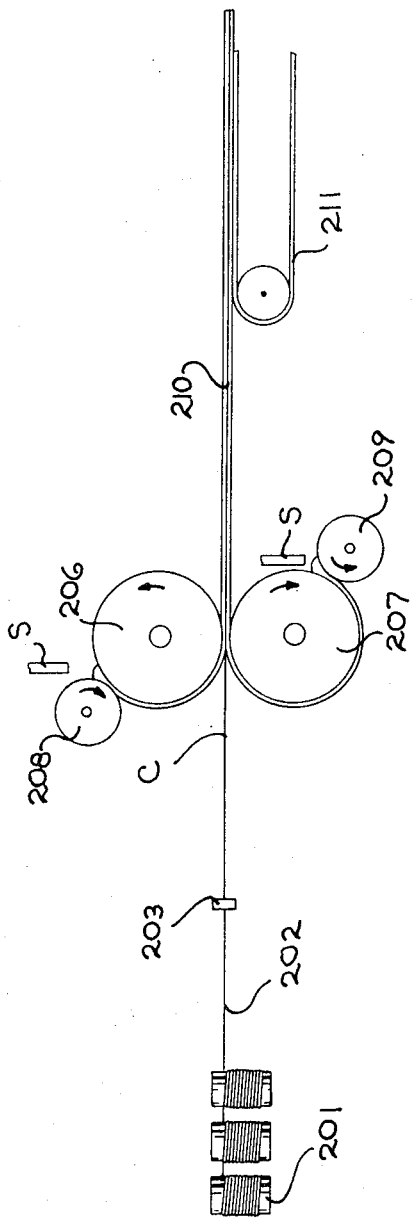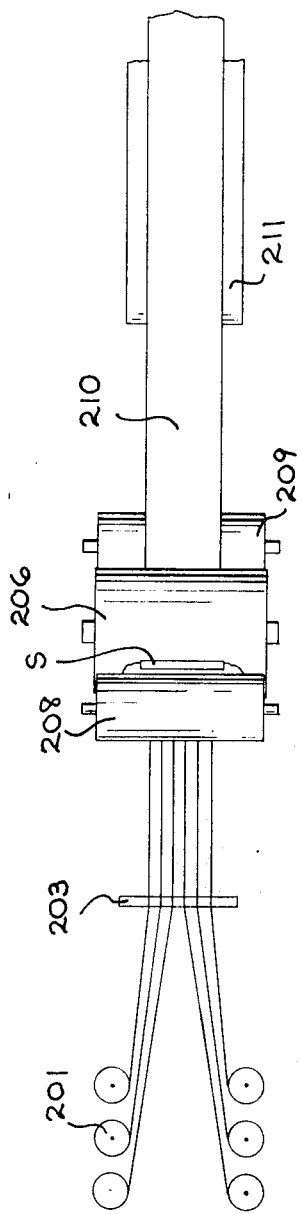
FIG. 12
FIG. 13
INVENTORS
ALFRED MARZOCCHI
FRANK J. LACHUT
BY
ATTORNEYS

United States Patent Office 3,726,753
Patented Apr. 10, 1973

3,726,753
METHOD OF PRODUCING SHEET MATERIAL
Alfred Marzocchi, Cumberland, and Frank J. Lachut, Pawtucket, R.I., assignors to Owens-Corning Fiberglas Corporation
Application Dec. 27, 1966, Ser. No. 604,944, which is a division of application Ser. No. 452,096, Apr. 30, 1965, now Patent No. 3,390,714, dated July 2, 1968. Divided and this application Jan. 26, 1968, Ser. No. 700,979
Int. Cl. B32b 5/02
U.S. Cl. 161—144    5 Claims

ABSTRACT OF THE DISCLOSURE

A method of making a glass reinforced rubber-like material by drawing an arrangement of parallel glass cords together and then between two converging layers of said rubber-like material to effect a combining of the two layers with the parallel glass cord sandwiched therebetween.

---

This is a division of application Ser. No. 604,944, now Pat. No. 3,390,714, filed Dec. 27, 1966, which is in turn a division of application Ser. No. 452,096, filed Apr. 30, 1965, now U.S. Pat. No. 3,311,152.

The present invention relates to tire constructions. More particularly, the present invention relates to a pneumatic tire construction employing a novel reinforcing system.

In conventional tire constructions, both passenger, truck and off-the-road tires, a number of conventional fabrics have been employed as reinforcement components, usually referred to as the carcass. Thus, over the years, cotton, rayon, nylon, polyester ("Dacron"), and even fine high tensile steel wire, have been employed in fabricating the carcass plies of tire constructions.

All of these aforementioned organic textiles possess certain individual properties which have made them a desirable reinforcing component, e.g., carcass, for tires. Glass fibers, as such, have also been suggested as a candidate reinforcing component for pneumatic tires. See, for example, Thomas U.S. Pat. No. 2,184,326.

The earliest reinforcing fabric was cotton. Cotton, unfortunately, is subject to moisture degradation and elongation upon exposure to moisture. Rayon, on the other hand, is quite low in modulus and also possesses low strength per unit cross sectional area. Polyamide fibers, e.g., nylon, possess considerably increased strength as compared to rayon, but unfortunately suffers undesirable elongation under load. This is usually attributed to tension stresses developed in the tire under service conditions which, of course, cause heat build up. This phenomenon also causes the tire casing to increase in size which sets up stresses, causing ultimate cracks to develop in the tread, greatly reducing of the resistance of the tread to wear. "Flat spotting" is also associated with nylon tires and is evident in a thumping which is very obviously noticeable to the driver of the auto on which mounted. All of the candidate organic fibers used to date are possessed of the common problem attributed to elongation in that tires produced by different manufacturers in different facilities are of different overall dimension.

Conventional bias-type tires employing rayon or nylon carcasses are also known to exhibit "squirming," which is manifested in undesired tread movement under load, particularly upon braking, cornering, acceleration, etc. This normally results in unusual tread wear and frequently in an unstable condition with respect to the gripping action of the tread upon the road surface.

It is an object of the present invention to provide a pneumatic tire employing a novel carcass reinforcement based upon a particular glass fiber assembly or "cord" and a specific arrangement thereof which together combine to yield a tire which is improved in almost every respect as to wear, dimensional stability, general performance characteristics and, particularly, improved mileage.

It is also an object of the present invention to provide a "bias-type" carcass reinforced, pneumatic tire which is eminently more stable in dynamic application than tires known heretofore.

It is also an object of the present invention to provide a bias-type tire employing, in part, polyamide, e.g., nylon, carcass reinforcement in combination with assembled fibers, e.g., cords in the form of plies which obviate the normal difficulties normally associated in reinforcement by polyamide fibers, e.g., nylon.

It is additionally an object of the present invention to provide a radial tire featuring glass cord reinforcement in the form of a single radial carcass ply in combination with one or more "belt" or restricting plies.

It is still another object of the present invention to provide a novel reinforcing system for ready adoption in retreading operations which are of particular economic significance in the field of truck and off-the-road tires.

It is additionally an object of the present invention to provide a tire possessing novel reinforcement which eliminates tread "squirming," thereby yielding a tire which lends to the vehicle upon mounted greater stability, greater tire wear and greater safety under conditions normally involving parameters of instability.

It is likewise an object of the present invention to provide a novel reinforcing system which is adapted to be readily incorporated into conventional tire manufacturing techniques.

It is still another object of the present invention to provide a reinforcing system which lends uniformity to tire manufacturing operations and, as well, to the ultimate tire, e.g., uniformity of tire dimension is achieved providing that the same tire specifications are followed and regardless of the particular tire building facility utilized.

At the same time, it is an object of the present invention to provide a tire which is improved as to dimensional stability over a period of long road service.

In keeping with the just-preceding object, it is an additional object of the present invention to provide tire constructions which are to a greater degree utilizable for purposes of recapping; thus increasing the ultimate service life of the basic tire carcass.

It is also an object of the present invention to provide a novel and improved technique for fabricating a carcass construction for a pneumatic tire.

It is also an object of the present invention to provide a novel bead ring construction featuring improved bead integrity and avoidance of distortion of the bead ring components.

It is likewise an object of the present invention to provide a tire which inherently possesses the ability to impress a more uniform "footprint," as it were, under varying road conditions encountered under normal as well as extraordinary service use.

The foregoing, as well as other and additional objects of the present invention, will become apparent to those skilled in the art from the following more detailed description taken in conjunction with the annexed sheets of drawings on which there are presented, for purposes of illustration only, a number of variant embodiments of (1) tire constructions, (2) tire reinforcing components and (3) techniques of manufacture in accordance with the present invention.

In its simplest form, the present invention envisions a pneumatic tire construction composed of spaced beads, a connecting carcass and a ground engaging tread extending peripherally about the crown portion of the carcass, in which the carcass includes, at least in part, a layer containing a plurality of closely spaced, mutually parallel cords composed of a plurality of assembled strands of substantially continuous glass filaments; said layer preferably including an elastomeric matrix preventing substantial contact of adjacent fibers within the cord assembly.

In the drawings:

FIG. 1 is a generally three-quarter perspective view of a section of a pneumatic tire in which the outer tread and portions of the bias ply carcass components have been broken away for purposes of more clearly showing the interior reinforcing structure in accordance with one embodiment of the present invention;

FIG. 2 is an elevation view of the tire shown in FIG. 1 looking at the tread head-on but with a portion of the tread as well as portions of the reinforcing plies broken away in order to better show the relative angular disposition of the several carcass components;

FIG. 3 is a perspective view of a radial ply tire construction shown in perspective three-quarter view with a portion of the tread, side wall and the carcass broken away in order to show the interior constructional details in accordance with another embodiment of the present invention;

FIG. 4 is an elevation view similar to that of FIG. 2, but of the tire shown in FIG. 3;

FIG. 5 is a generally three-quarter perspective view of a radial tire construction embodying features of reinforcement in accordance with another embodiment of the present invention;

FIG. 6 is an elevation view similar to FIG. 2 and FIG. 4, but of the tire shown in FIG. 5;

FIG. 12 is a schematic view illustrating a particular technique for continuously producing a glass-containing reinforcing component suitable for utilization as a carcass ply or a reinforcing "belt" in tire constructions in accordance with the present invention; and FIG. 13 is a schematic top plan view of the apparatus shown in side elevation in FIG. 12.

Figure 7:
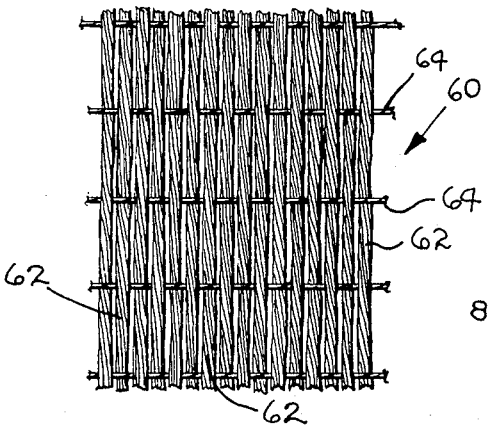
FIG. 7 is a top plan view of a piece of woven fabric constituting a reinforcing carcass ply in accordance with the present invention.

Tires embodying constructional features in accordance with the present invention exhibit extremely desirable performance characteristics under actual road tests as will become evident from the examples appearing hereinafter.

As used here, a "filament" of glass is meant to define an individual fiber of glass. A "strand," on the other hand, is a collection of a great plurality of individual "filaments." A strand may include 104 filaments, 208 filaments, and even up to 500–2000 individual filaments gathered together in a manner well-known in the art and technology of glass fiber manufacture. A "cord" or "bundle" is made up of a plurality of strands, e.g., ranging from 2 to 30 and even up to 50 strands, plied or assembled together continuously. Strands may possess a twist, reverse twist, or no twist at all. Several different assemblies of strands may be combined to yield an ultimate "cord" having a total number of strands equal to the number of strands in the first assembly and the number of these assemblies combined to make up the final cord. Thus, a cord may be composed of a large number of individual filaments ranging in number from 200–30,000. By way of illustration, a cord construction may feature 10 strands of continuous filaments gathered together with or without twist. Additionally, 3 of the just foregoing mentioned 10-ply strand assemblies may be joined together with or without twist to form a 30-strand assembly; each strand being composed, for example, of 100–200 filaments yielding a 3000–6000 filament cord or bundle assembly. The latter is frequently designated a "10/3" cord. A "10/5/3" cord is an assembly of three 10/5 yarns; the latter including five 10-strand yarn assemblies. The latter thus includes [10 x 5 x 3] x 200 filaments, e.g., 30,000.

Table 1 hereinbelow lists the properties possessed by a single glass fiber or filament.

TABLE 1.—GLASS FIBER SINGLE FILAMENT PROPERTIES

| | | |
|---|---|---|
| Tensile strength | p.s.i | 500,000 |
| Tenacity | g.p.d | 15.3 |
| Ultimate elongation | percent | 4.8 |
| Elastic recovery | do | 100 |
| Toughness | p.s.i | 11,900 |
| Modulus | p.s.i | 10,500,000 |
| Coefficient of thermal expansion | | $2.8 \times 10^{-6}$ |
| Water adsorbency | percent | 0.3 |
| Moisture regain | do | 0.0 |

In order that the glass fibers can most effectively contribute reinforcing action to the tire, it is desirable that the glass fibers be first treated or sized, as it were, to provide a protection against interfilament destructive action. The latter is overcome preferably by a combination of treatments to provide a protective coating as well as a bonding and anchoring agent on the surface which will enhance the bonding between the glass fiber surface and the elastomeric material. This is usually accomplished by a combination of sprayed-on liquid size treatments just after the glass filament is formed and a subsequent impregnation of the strands or cords as they are formed, usually simply by introducing the gathered filaments into a pool of the treating liquid while simultaneously distorting the strand filaments to effect penetration into the zones between fibers, thereby insuring complete impregnation. Following impregnation, the coated strands or cords are given a mild heat treatment to set the treating agent. A system of treatment for glass fibers may involve a first surface treatment embodying an anchoring agent which enhances the bonding relationship between the glass fiber surface and the ultimately used elastomeric material. A suitable anchoring agent is represented by the amino silanes such as gamma-aminopropyl-triethoxy silane or by a similar silane having a carboxyl group in the organic group attached to the silicon atom or an amino or carboxyl group in the carboxylato group of a Werner complex compound. These may be applied to the glass fiber surfaces or incorporated as a component of a size composition and applied to the glass fibers as they are gathered together in the formation of strands, yarns or the like; all of which is more fully described in the copending application Ser. No. 406,501 filed Oct. 26, 1964, entitled "Glass Fibers Treated for Combination With Elastomeric Materials and Method." A desired strong bonding relationship can also be achieved by the impregnation of the strands or other multi-filament glass fiber structure with a composition formulated to contain, in addition, an elastomeric material, preferably in an uncured or an unvulcanized state as described in the aforesaid copending application Ser. No. 406,501, as will hereinafter be illustrated by way of examples.

For purposes of comparison, the following table lists the reinforcement cord properties comparing glass "cords" with organic cords.

TABLE 2.—REINFORCEMENT CORD PROPERTIES GLASS FIBERS VERSUS ORGANIC CORDS

|  | Glass fibers | Rayon | Nylon | Polyester |
|---|---|---|---|---|
| Strength, p.s.i. | 407,000 | 94,000 | 122,000 | 104,000 |
| Toughness, p.s.i. | 9,900 | 5,800 | 10,200 | 9,900 |
| Impact resistance, ft. lbs. × $10^{-4}$/denier | 3.95 | 1.87 | 4.08 | 3.41 |
| Modulus, p.s.i. × $10^{-6}$ | 8.45 | 0.96 | 0.63 | 0.57 |
| Elongation, percent | 4.8 | 9.8 | 19.3 | 18.5 |

The properties appearing in the foregoing Table 2 speak generally for themselves. They generally demonstrate the toughness and impact strength of glass fiber cords. This, coupled with their high dimensional stability, demonstrates their great utility. Additionally, this, coupled with their relatively inert character to temperature or humidity changes, makes them a desirable and, in fact, an ideal tire reinforcement material when used in the manner disclosed herein.

The following are representative of size compositions which may be applied to the glass fibers in forming.

EXAMPLE I

| | Percent by weight |
|---|---|
| Gamma-aminopropyltriethoxy silane | 0.5–2.0 |
| Glycerine | 0.3–0.6 |
| Water | Remainder |

EXAMPLE II

| | Percent by weight |
|---|---|
| Partially dextrinized starch | 8.0 |
| Hydrogenated vegetable oil | 1.8 |
| Lauryl amine acetate (wetting agent) | 0.4 |
| Non-ionic emulsifying agent | 0.2 |
| Glycylato chromic chloride | 1.0 |

EXAMPLE III

| | Percent by weight |
|---|---|
| Saturated polyester resin | 3.2 |
| Polargonate amide solubilized with acetic acid | 0.1 |
| Tetraethylene pentamine stearic acid | 0.1 |
| Polyvinyl alcohol | 0.1 |
| Polyvinyl pyrrolidone | 3.0 |
| Gamma-aminopropyltriethoxy silane | 0.3 |
| Acetic acid | 0.1 |
| Water | 93.1 |

The size composition is merely applied to the glass fiber filaments as they are gathered together and the strand of sized glass fibers is allowed to dry in ambient air.

In the foregoing examples, the gamma-aminopropyltriethoxy silane can be replaced as an anchoring agent with other amino silanes such as gamma-aminopropylvinyldiethoxy silane, n(gamma - triethoxysilylpropyl)propylamine, beta-aminoallyltriethoxy silane, aniline silane derivatives, etc.

While it is not essential to impregnate the strand or bundle of glass fibers, it is preferred to impregnate the bundle of glass fibers for fuller separation of the fibers one from the other in the bundle and to incorporate an elastomeric system into the interior of the glass fiber bundle whereby the fibers can more effectively become anchored in the elastomeric system.

For this purpose, the strand or yarn of glass fibers is simply unwound from a supply drum and advanced submergedly into a bath of the elastomeric impregnant. Thence, the impregnated yarn is pulled through a wiping die which works the impregnating liquid into the innermost regions of the bundle or strand and also serves to wipe off excess material.

The following are a few representative liquid compositions containing an elastomeric material which may be used to impregnate the bundle or strand of glass fibers.

EXAMPLE IV

| | Parts by weight |
|---|---|
| Neoprene rubber | 100 |
| Powdered magnesium oxide | 4 |
| Powdered zinc oxide | 5 |
| Channel Black | 15 |
| Thiate B (trialkyl thiourea accelerator) | 1 |

The foregoing ingredients after being mixed on a mill are combined with sufficient of a suitable rubber solvent to form a liquid impregnant bath.

EXAMPLE V

| | Parts by weight |
|---|---|
| Paracril C rubber (Buna N) | 100 |
| SRF carbon black | 25 |
| Powdered zinc oxide | 5 |
| Aminox (reaction product of diphenyl amine ester) | 0.5 |
| Stearic acid | 1 |
| Dicumyl peroxide | 40 |

The foregoing ingredients after being mixed on a mill are combined with sufficient of a suitable rubber solvent to form a liquid impregnant bath.

EXAMPLE VI

| | Parts by weight |
|---|---|
| Lotol 5440—U.S. Rubber Company Lotol 5440 is a 38% dispersed solids system including a butadiene-styrene-vinyl pyridine terpolymer latex, a butadiene styrene latex and a resorcinol-formaldehyde resin | 60 |
| Water | 39 |

EXAMPLE VII

| | Parts by weight |
|---|---|
| Resorcinol formaldehyde resin | 2 |
| Formalin (37% solution) | 1 |
| Concentrated ammonium hydroxide | 2.7 |
| Vinylpyridine terpolymer (42% latex) | 25 |
| Neoprene rubber latex (50% solids) | 41 |
| Butadiene latex (60% solids) | 5 |
| Sodium hydroxide | .05 |
| Gamma-aminopropyltriethoxy silane | 1 |
| Vulcanizing agent | 1 |
| Water | 1100 |

The impregnated cord (multiple strand assemblies) are thereafter converted into a fabric by weaving technique or embedded in an elastomeric matrix by a combination creeling and calendering technique as illustrated schematically in FIG. 13 and more specifically described hereinafter. The woven impregnated cord fabric and/or calender stock, each of which is composed of mutually parallel cords of glass fiber strands, is then bias cut in the case of incorporation into bias tires, or otherwise cut to appropriate size in the case of incorporation, as peripheral tread reinforcing belts (sometimes referred to as "breaker strips"), in radial tires. In either case, the fabric and/or calendered stock containing the mutually parallel cords is adapted to be incorporated in conventional tire building techniques.

Reference may now be had to the drawings wherein a number of tire constructions in accordance with the present invention, as well as other features of novelty contemplated by the present invention, are illustrated. In FIG. 1, the reference numeral 20 identifies a 4-ply bias-type tire. The tire is composed of spaced bead rings 22 and 24, each of which includes a plurality of wire cords 25. Extending from bead to bead are a plurality of carcass plies 26, 28, 30 and 32. Each of the plies is wrapped about the bead ring, as illustrated in dotted line and in accordance with conventional practice. The plies 26, 28, 30 and 32 are composed of impregnated cords composed of glass strands; the glass filament components of which have been sized with one or the other of the sizes described in the foregoing Examples I–III. The cords are mutually parallel with cords in the same ply. The reference numeral 34a identifies a rubber cushion ply making up the inner surface of the tire. A tread 33 extending peripherally about the crown portion of the carcass and a covering layer of rubber stock 34 in the side wall region on either side completes the tire construction. The mutually parallel glass cords in ply 26 define an angle of about 38° with the peripheral centerline 38 of the tread 33 of the tire. The cords in ply 28 are oppositely inclined from the cords in ply 26 and again define an angle of about 38° with the peripheral centerline. The cords in the ply 30 are parallel to the cords in the ply 26, while the cords in uppermost ply 32 are parallel with the cords in ply 28. The angular disposition of the cords in the respective plies is most graphically illustrated in FIG. 2, particularly as to the relationship with the peripheral centerline 38 which corresponds to the centermost groove in the tread 33. The cords in the bias plies may range from 27-38°, in angular disposition to the peripheral centerline of the tire.

FIGS. 3 and 4 illustrate a radial tire construction of the invention. The tire 40 is composed of spaced annular bead rings 42 and 44; each of which contains a wire cord 45. The carcass is composed of a single ply 47 including mutually parallel cords of glass strands. The individual cords are 90° disposed to the peripheral centerline 48. The ply 47 extends from bead to bead and is turned up about the bead, as illustrated at reference numeral 49. The reference numeral 50 designates an inner cushion ply beneath the radial ply 47, while reference numeral 51 identifies the tread which at the shoulder area 52 joins the side wall 53 on each side as shown. The radial tire construction additionally includes reinforcing "belts" or "bands" 55 and 57 between the radial ply 47 and the tread 51. These "belts" or "bands" are generally similar in construction to the radial ply 47; that is, they are composed of a plurality of mutually parallel glass cords woven into a fabric (the cords having been previously impregnated) or the cords being embedded in a rubber matrix by the calendering technique referred to both hereinbefore and in more detail hereinafter. The reinforcing plies 55 and 57, however, extend from shoulder to shoulder, rather than completely from bead to bead. The reinforcing "belt" plies 55 and 57 are bias cut so that the individual cords in the ply 55, for example, define an angle of about 18° with the peripheral centerline 48 of the tire which corresponds with the centermost groove of the tread 51. The cords in the uppermost reinforcing belt 57 are oppositely inclined to the cords in the belt 55 to define an opposite angle of 18° with the peripheral centerline. See FIG. 4 for a more graphic illustration of the relationship of the cords in the several plies.

A variant radial tire construction in accordance with the present invention is illustrated in FIGS. 5 and 6. With but one departure, the tire illustrated in FIGS. 5 and 6 is the same as the tire illustrated in FIGS. 3 and 4 and accordingly the same reference numerals, but bearing the subscript *a*, will be employed to designate the common parts. In this tire of FIGS. 5 and 6, the reinforcing band or belt 55 and 57 is replaced by a single reinforcing belt 56. In this embodiment, the "belt" 56 is bias cut in such fashion that the mutually parallel cords of glass strands (many filaments) define an angle of O with the peripheral centerline 48*a*.

In FIG. 7, there is shown a "swatch" 60 taken from a woven fabric suitable for incorporation as a carcass ply or a reinforcing band or belt in any of the tire constructions illustrated in the previous figure. The "swatch" is taken from a woven textile composed of mutually parallel "warp" cords 62 secured together by a "woof" cotton pick 64 at spaced intervals. The cords 62 are composed of an assembly of strands, for example, 3; each of the latter including a 10-strand assembly. The ultimate cord, as shown, embodies a slight amount of twist for the purpose of overcoming any wildness which might be inherent in any opposite twist employed in assembling the 10-strand subassembly. A 3½" to 6" wide strip of the woven fabric shown in FIG. 7 can be utilized to form the peripheral reinforcing band or belt 56 in the tire construction of FIG. 5. The fabric 60 can also be used to form the radial ply 57 in the tire construction of FIG. 3. Continuous sheets, 55' wide, of this woven construction can also be bias cut in accordance with conventional bias cutting techniques to form the carcass plies 26, 28, 30 and 32 in the tire construction of FIG. 1, or bias cut to form the reinforcing belts 55 and 57 in the construction of FIG. 3.

Figure 8:
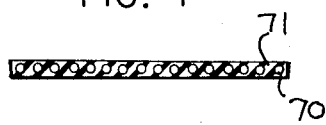
FIG. 8 is an edge view of a tire reinforcement component representing a variant construction in accordance with the present invention.

FIG. 8 illustrates a variant construction featuring side-by-side mutually parallel cords 70, each composed of an assembly of strands, each of which is composed of a multiplicity of glass fibers. In this embodiment, the cords 70, seen in section, are embedded in an elastomeric matrix 71; the whole constituting a thin sheet. This construction, only a segment of the sheet being shown in edge form in FIG. 8, may be produced by a combination of creeling and calendering, by laminating or other suitable techniques, e.g., "kiss" coating, etc. With a multiple (4–5) roll calender, one pass will suffice; while several passes will be necessary in a 3-roll calender.

Figure 9:
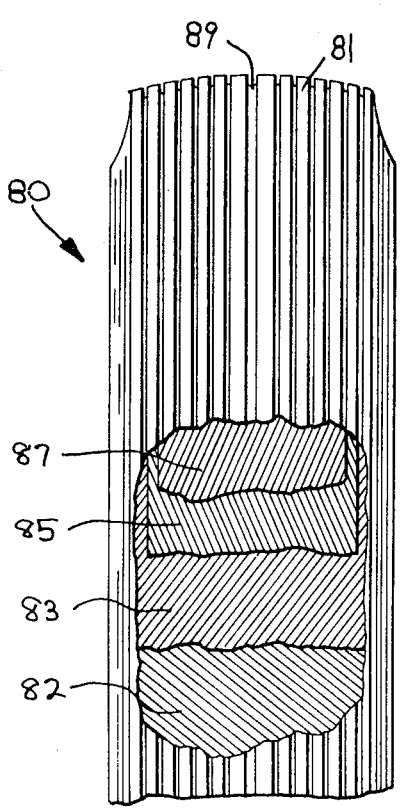
FIG. 9 is an elevation view of a tire embodying a particular construction in accordance with the present invention and having portions of the tread and of the various carcass components broken away for clarity of illustration.

A tire construction embodying particularly desired features of construction in accordance with the present invention is shown in FIG. 9. The tire 80 includes spaced bead rings, not shown, adapted to engage the rim flange of a wheel, a tread 81 and a carcass therebeneath composed of nylon bias plies 82 and 83 extending from bead to bead. The plies 82 and 83 are oppositely inclined, as shown. In occordance with the present invention, the tire 80 includes, situated between the top carcass ply 83 and the tread, a pair of reinforcing "bands" or "belts" 85 and 87. Both of the latter are composed of mutually parallel cords of glass in which the individual cords define an angle of 24° with the peripheral centerline (corresponding with the centermost groove 89 in the tread 81). The mutually parallel cords in the reinforcing "belts" or "plies" 85 and 87 are oppositely inclined, one from the other, as shown. The bottommost reinforcing belt 85 is slightly wider than the uppermost reinforcing belt 87. In any event, they proceed completely about the periphery of the crown portion of the tire and their ends are either bias spliced or butt spliced in conventional fashion. The plies 85 and 87 are preferably composed of the mutually parallel cords embedded in an elastomeric vulcanizable matrix, as shown in FIG. 8, having in mind ease of tire building. The cords in the belt plies may range from 22–30° in angular disposition to the peripheral centerline of the tire, although 24° is preferred.

Figure 10:
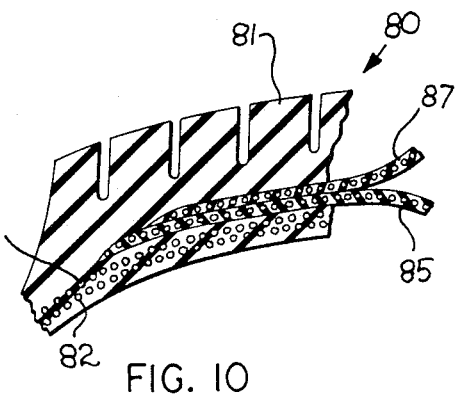
FIG. 10 is a partial sectional view of the tire construction illustrated in FIG. 9.

FIG. 10 is a partial sectional view of the tire 80 of FIG. 9 and serves to better show the reinforcing belts or bands 85 and 87 as being composed of the mutually parallel cords embedded in a vulcanizable elastomeric matrix.

Figure 11:
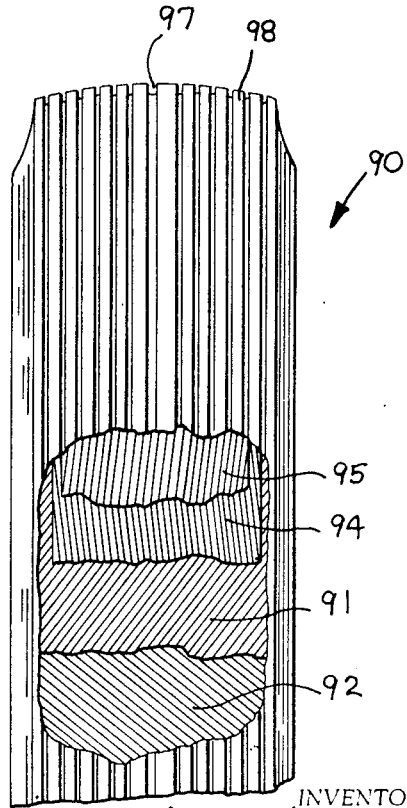
FIG. 11 is a view similar to FIG. 9, but illustrating a tire construction representing a still further embodiment of the present invention.

FIG. 11 illustrates another preferred reinforcing system in accordance with the present invention. The tire 90 is a retreaded tire; that is, the tire has been subjected to a retreaded operation employing reinforcing bands or belts in accordance with the present invention. In retreading, the tire is mounted in rotatable fashion and in inflated condition and the worn tread is accurately removed; care being taken not to injure the basic carcass plies, identified by the reference numerals 91 and 92 in FIG. 11. These carcass plies may be rayon or nylon and in FIG. 11 are illustrated as a 2-ply bias tire. In accordance with the invention, in the course of the retreading operation, there are employed two reinforcing belts 94 and 95 which are composed of mutually parallel cords of glass strands. The belts extend generally from shoulder to shoulder; the lowermost belt 94 being slightly wider than the uppermost belt 95. The reinforcing belts are bias cut and assembled on the crown so that the cords refine a very slight angle of 7° with the peripheral centerline 97 of the tread 98. Retread tires employing this construction under service conditions have been found to result in remarkable tread wear.

Impregnation of the glass cords (assembly of strands) is usually accomplished by pasing a continuous length of cord down into a pool of the impregnant solution or liquid (Examples IV–VII hereinabove list suitable impregnant formulations) under conditions which tend to promote complete penetration of the impregnant liquid into the interstices or voids, as it were, between filaments of glass making up the strand and the cord. This may be done, for example, by causing the cord to pass about a peg while submerged, causing some distortion of the filaments tending to eliminate air from these interstitial voids and entrance of the liquid impregnant thoroughly about the individual fibers. A wiping die through which the cord is passed after emerging from the impregnant bath also aids in thorough impregnation. Thereafter, the cord is passed through a mild hot air oven sufficient to dry the impregnant to a handleable non-tacky state. Care is taken in drying that curing is avoided. It is also possible to effect impregnation of the cords as a woven fabric. The components of the cord, e.g., the filaments and strands, would, of course, be given a preliminary application of size after forming and/or during forming. Then the fabric made up of mutually parallel cords may be passed into a reservoir or pool of the impregnant in a manner similarly to that described with the individual cord.

There will now be described several particularly desirable tire constructions embodying preferred constructional features together with physical test results and, as well, road test results closely simulating actual service conditions.

EXAMPLE VIII

A number of 8.50 x 14 tubeless passenger tires were produced as described as follows. The tires were 4-ply bias-type tires of the type illustrated in FIGS. 1 and 2. The glass cord employed in fabricating the carcass plies is designated at ECG 150 10/0 1.5 S t.p.i. In this designation, E identifies an electrical glass; C identifies a continuous filament; and G identifies the individual fiber diameter as 0.00036 inch. The designation "150" stands for 15,000 yards per pound nominal of basic strand. The designation "10/0" indicates that the cord is composed of 10 strands. The "1.5 S t.p.i." designates that in assembling the cord from the 10 strands there was imparted 1.5 S twists per inch. A cord has a S twist if, when it is held in the vertical position, the spirals around its central axis conform in direction of slope to the central portion of the letter S. It may be mentioned here parenthetically that a Z twist is possible if the spirals referred to conform in direction of slope with the central portion of the latter Z. The cord was converted into a carcass fabric by drum winding the cord (pickless) so that the cords were in mutually parallel relationship, thence the cords transferred to a calender yielding a calendered fabric having mutually parallel cords therein in an amount numbering 24 cord ends per inch. The calendered fabric measured 0.046 inch in thickness. The calendered glass cord carcass ply was bias cut at an angle of 26° to yield 4 plies having the following dimensions:

| Ply | Inches | |
|---|---|---|
| | Width | Length |
| 1st | 29 | 48 |
| 2d | 28 | 48¼ |
| 3d | 26 | 48½ |
| 4th | 24⅛ | 48¾ |

The carcass plies were combined into a tire building operation in conventional fashion. The bead construction comprised 5 layers of 5 wires each. The beads were wrapped with 1¼" wide strip of 0.040 gauge stock. A flipper strip 2¼" wide was employed. As a chafer, there was utilized 2⅝" skim coated rayon multifilament, 20 x 20 square woven. A 1¼" gum strip was employed under the turnups in the tire building operation. After application of the tread stock, the green tires were removed from the drums and vulcanized in a Bagamatic mold employing internal temperature of 375° F. steam (170 p.s.i.) and an external temperature of 335° F. steam. These conditions were held for 21 minutes. No post inflation was employed. The final tire weighed 30 pounds. The resulting tires possessed a bias crown angle as cured of 38° taken with respect to the peripheral centerline, e.g., the center groove of the tread of the tire. The tires were subjected to road testing as follows. Four of the tires were mounted on a 1962 Chrysler. The tires were inflated to 28 p.s.i. and the loading was adjusted to 1180–1190 pounds per tire. The road test continued for 24 hours daily on a five-day cycle at 1125 miles per days. The road surface involved was granulated macadam and concrete. The speed of the vehicle was maintained at 60 miles per hour. The test road was 385 miles long, including 88 miles of sharp curves, dips and hills, 42 miles of rounding curves and hills, and 255 miles of straight road. The tires were examined after completing 20,250 miles. The original tires in a plunger test with a three-quarter inch probe yielded a value of 5190 pounds. A comparative 4 bias ply carcass nylon tire tested 3948 pounds. The tires were rotated, each 1125 miles, by putting the front tires straight back while the rear tires were crisscrossed to the front. The tread depth was measured periodically. After 20,250 miles, the tread depth of four tires revealed the following miles per mil of tread wear, e.g., (miles/.001): 136, 155, 141 and 162. Identical tires subjected to the same road test but at an inflation of 32 p.s.i. yielded the following tread wear values for the four tires in miles per mil (miles/.001): 147, 146, 139 and 148. Extrapolation of the tread wear data at the 20,250 mile yielded an estimated ultimate mileage of 53,000 miles. The 28 p.s.i. inflated tires were then subjected to continued road testing on the same test road until a mileage of 43,000 miles. The tread wear for the tires in miles per mil (miles/.001) ranged from 118 to 140.

The tires at this point were removed from the car and recapped, then remounted on the car and run to from 48,000 to 51,500 miles. One of the tires at a mileage of 47,250 miles was removed and the tire cord was separated from the tire by dissolving in a hot Dowtherm E solvent. The cord was then subjected to radiographic analysis which revealed the cord to be continuous, e.g., no broken cord or fiber. The original tires as vulcanized revealed an embedded cord breaking strength of 70 pounds. The final 47,250 mile tire, upon removal of the cord, was subjected to an embedded breaking strength yielding a value of 60 pounds. The final worn tires, upon examination of the grooved depth, revealed a tread wear in miles per mil of 140 to 153. Under the conditions of the test, the test report revealed that the stability of the tires was very good with no rollover or sway on curves. The tires were reported to grip the road well in wet weather. The general appearance of the tire at 43,000 miles was reported very good. No natural cracking developed throughout the test. Stone cutting in the grooves was reported as very slight.

EXAMPLE IX

A number of radial type tires, as generally illustrated in FIGS. 3 and 4 of the drawings, were built and road tested as follows. The tires were 135 x 380 tubeless type tires. The carcass was composed of a single radial ply and a double ply restrictive belt located circumferentially about the single radial ply and extending substantially from shoulder to shoulder. The glass cord utilized in fabricating the carcass and restrictive belt plies is designated a G 150 10/3 1.5 t.p.i. cord. The G identifies a basic glass filament diameter of 0.00036 inch in diameter. The "150" designates 15,000 yards per pound of the basic strand. The "10/3" designates that there was first prepared a 10-strand assembly employing a 2.5 Z uptwist. Three of the latter were then combined to form the cord, using a 1.5 S twist per inch in the assembly of the three 10-strand yarns. The cord was thence impregnated in the manner described hereinbefore and thence woven into a fabric featuring a warped construction featuring 16 ends per inch of the cords and a filling yarn composed of 3 picks per inch of a 50/2 cotton yarn. The 16 end per inch glass cord fabric with the 3 cotton picks was combined with rubber stock on a calender set to yield a calendered fabric having a gauge of 0.049 inch. This fabric was cut to appropriate size and utilized as the radial carcass ply in which the individual cords proceeded from bead to bead at an angle of 90° with the peripheral centerline of the cured tire. Additional amounts of the same glass cord calendered fabric was utilized, that is, bias cut in such fashion that, when applied as a restrictive band or belt, the cured tire revealed a bias "belt" or "band" bias angle of 18° between the cords and the peripheral centerline of the tire. The cords in the two bands were oppositely inclined for dynamic stability. The ultimately vulcanized tires were road tested by mounting on a Falcon under a load condition of 725 pounds per tire. The rim upon which the tire was mounted was a 4" rim. The road testing involved a primary road 425 miles; such being traversed in an 8-hour shift. Maximum speeds of 60-65 miles per hour were maintained for at least 90% of the cycle. The tires were inflated to 26 p.s.i. The test was continued for a 6-day cycle in which the weather was clear and the road surface was macadam. The load of 725 pounds per tire represents a 30% overload based on a 555 pound maximum load according to Michelin specification at an inflation pressure of 20 p.s.i. The tires ran for a total of 44,400 miles, at which time the test was discontinued with tread remaining on two of the tires. The wear characteristic upon measurement was determined to be 262 miles per mil. By comparison, a comparable size tire, e.g., a 6.50 x 13 2-ply bias tire, tested under the same speed and load conditions yielded an average mile per mil value of from 90-100. Measurement of the tread depth of the two road tested tires having tread remaining if extrapolated gives an estimated miles to smoothness value in the order of 70,000 miles. Measurement of the test tires over the duration of the test period as to average height and width section dimensions yielded a percent range in the range of 0.2% and 0.3%, respectively, from original tire dimensions. Visual observation of the test tires revealed a qualitatively flatter profile and footprint than other conventional radial design tires. One of the original tires failed to last the 44,400 mile duration, but instead failed at 40,158 miles. Examination revealed side wall rubber cracking. X-ray examination clearly indicated the cord to be in satisfactory condition.

EXAMPLE X

A number of 8.55 x 14 tires employing constructional features as generally illustrated in FIG. 9 were built. The tires contained two nylon carcass plies of the bias type (38° cord angle) extending from bead to bead. To complement the two bias nylon plies and lend stability to the ultimate tread in accordance with this invention, the tire construction was modified to include a pair of reinforcing "belts" containing mutually parallel cords of glass (assembly of strands) utilizing a calendered fabric construction as described hereinbefore in Example VIII. The belts were assembled onto the crown portion of the carcass prior to applying the tread in such fashion that the cords in the "belt" plies measured an angle of 24° with the peripheral centerline of the tire, as shown in FIG. 9. The belts were applied so that the cords in each were oppositely inclined. One tire, which road tested 11,550 miles on a Chrysler at speeds of 50-70 miles per hour at a cold inflation of 28 p.s.i., revealed a tread wear at the centerline of 140 miles per mil. Another tire so constructed, after 6,930 miles, revealed a wear at the centerline of 145 miles per mil. In contrast, two 4-ply nylon control tires over 12,705 and 12,380 mile tests revealed a wear, respectively, of 84 miles per mil and 87 miles per mil. Tires constructed in accordance with this example, namely, employing two nylon bias carcass plies and reinforcing "belts" formed of calendered glass cord, represent a preferred embodiment of the present inveniton, inasmuch as the ultimate tire appears to possess the tread wear and stability characteristics of a radially designed tire of the Michelin type, yet it is capable of being constructed on existing tire building equipment of the conventional bias type.

EXAMPLE XI

To demonstrate the applicability of the reinforcing system of the present invention in retreading operations, two conventional tires were retreaded, but incorporating, under the tread and over the crown portion of the rayon bias carcass plies, two layers of a glass cord fabric bias cut to yield a cord angle of 7° with the peripheral centerline of the tire when ultimately vulcanized. The lowermost layer "belt" or tape was 4" wide and the uppermost belt was 3½" wide. The belt fabric was a calendered assembly in which the cord content measured 20 ends per inch. The cords, of course, had been previously impregnated. These two tires retreaded with the two glass cord breaker plies were mounted on a taxi together with two conventional retreads as controls. After running 3,000 miles, the tires were transferred to a 1963 Chrysler driven at 65 miles per hour on the Louisville to Indianapolis Turnpike. The tires were checked and rotated every 525 miles. At the end of 2,075 miles of turnpike testing, the control tires measured a tread wear of 61 miles per mil, whereas the tires of the invention measured 155 miles per mil (average). The tires were then removed and subjected to a southwestern Texas control road test wherein the speed was held between 60-70 miles per hour at an inflation of 24 p.s.i. cold. The tires were rotated front straight back with the rear tires crisscrossed to the front, each 1155 miles. One of the tires of the invention failed at this road test at 6612 miles or a total mileage of 11,715 miles. An observation revealed that the failure was due to a side wall snap, rather than to a carcass weakness. This tire revealed a tread wear of 116 miles per mil. The other tire of the invention ran to 14,343 miles and revealed a tread wear of 91 miles per mil at the centerline. One of the control tires was smooth at the completion of the 14,343 miles total, while the other tire, though not smooth, measured a tread wear of 52 miles per mil at the centerline.

The reinforcing band or "belt" composed of an elastomeric matrix having embedded therein a spaced plurality of mutually parallel glass cords represents a particularly desired feature of the present invention since it is readily adapted into present tire building operations and lends greatly improved tread stability. The material in sheet form as produced on a calender or the like may be bias cut and further processed and handled as conventional organic textile fabrics. Viewed in section as, for example, in FIG. 8, it may be seen that the rubber component, on a volume basis, is about equal to that of the glass. In section, this relationship appears as one of area comparisons between the sectional portion indicating elastomer and the circles representing the cords in mutually parallel relationship. A volume ratio of elastomeric matrix to glass providing improved tread stabilizing properties falls within the range of from about 1.0/1.0 to about 3.0/1.0. Where the amount of glass exceeds the rubber on a volume basis, the strength retention decreases and, consequently, its ability to lend tread stability and general reinforcement is not as desirable as where the volume ratio of rubber to glass is within the prescribed ratio set forth hereinabove.

FIGS. 12 and 13 are, respectively, a schematic side elevation view and a schematic top plan view of an apparatus setup adapted to convert glass cords into calendered stock containing mutually parallel cords of glass embedded therein. As indicated hereinbefore, the apparatus involved consists of a combination of creeling and calendering apparatus. As in creeling, an array of rotatable spools 201 are provided, each containing a continuous length of the preferably previously impregnated cord wound thereon. Only six spools 201 are shown; it being understood that, to produce a 55" wide continuous length of the calendered stock, up to 1,000 or more spools may be involved, considering a cord spacing varying from 10 to 30 ends per inch of the 55" width. The array of cords 202 is passed over a "comb" or "reed" 23 which arranges the cords into mutually parallel relationship and also spaced as to provide from 10 to 30 e.p.i. (ends per inch). The cords C thence pass between principal opposed counterrotating rolls 206 and 207 of a 4-roll calender setup, wherein the cords are embedded in elastomeric stock. The rubber stock is fed into the nip between principal calender roll 206 and a counterrotating feed roll 208. The stock is also fed into the nip between principal lower calender roll 207 and a counterrotating feed roll 209. The calenders 206 and 207 are spaced apart a distance corresponding to the desired gauge of the final product 210. The calendered stock 210 is thence passed to a "take-off" conveyor 211. Although not shown, it is sometimes desirable to employ tension rolls on the delivery side of the calender rolls in order to pull the product through the calendered setup 206 and 207 in a uniform manner. The latter function is improved through the employment of a suitable brake arrangement for the supply spools, whereby a preselected tension can be established in the cords.

It will be appreciated that variations in constructional features, as well as substitution of equivalent components, may be undertaken without departing from the spirit and scope of the present invention, and all such obvious equivalents and substitutes are intended to be covered unless specifically excluded by the scope of the appended claims.

We claim:

1. A method of producing a continuous sheet of vulcanizable stock material containing a plurality of continuous lengths of glass cord in slightly spaced parallel relationship, which comprises:
   impregnating a continuous length of glass cord with an elastomeric impregnant to reduce contact between the glass elements making up the cord,
   arranging a plurality of spools each containing a continuous length of said impregnated glass cord in proximate array and disposed for substantially free withdrawal of said cords,
   drawing said lengths of cords simultaneously from said supply spools into a common generally flat plane,
   arranging said lengths of cords in closely spaced parallel relationship,
   continuously adding rubber stockmaterial to an upper and lower pair of parallel, cooperating mixing rolls, two of said parallel rolls carrying layers of said added freshly worked rubber on counterrotating surfaces thereof, said surfaces being spaced apart a distance corresponding to the thickness of the ultimately desired sheet,
   directing said parallel cords in said flat array between said layers of said freshly worked rubber to form a sandwich in which the parallel glass cords are embedded interiorly between said layers and
   continuously removing the said sandwich of the preceding step.

2. A method of producing a continuous sheet of vulcanizable stock material containing a plurality of continuous lengths of substantially inextensible material in slightly spaced parallel relationship, which comprises:
   impregnating a continuous length of substantially inextensible material with an elastomeric impregnant to reduce contact between the elements making up the cord,
   arranging a plurality of spools each containing a continuous length of said impregnated substantially inextensible material in proximate array and disposed for substantially free withdrawal of said substantially inextensible material,
   drawing said continuous lengths of substantially inextensible material simultaneously from said supply spools into a common generally flat plane,
   locating said continuous lengths of substantially inextensible material in closely spaced parallel relationship,
   continuously adding rubber stock material to an upper and lower pair of parallel, cooperating mixing rolls, two of said parallel rolls carrying layers of said added freshly worked rubber on counterrotating surfaces thereof, said surfaces being spaced apart a distance corresponding to the thickness of the ultimately desired sheet,
   directing said parallel continuous lengths of substantially inextensible material in said flat array between said layers of said freshly worked rubber to form a sandwich in which the parallel continuous lengths of substantially inextensible material are embedded interiorly between said layers and
   continuously removing the said sandwich of the preceding step.

3. The method as claimed in claim 2, wherein said steps are carried out in a manner that said lengths are in tension.

4. The method as claimed in claim 3, wherein the formed composite is pulled at a rate faster than the rate of rotation of said cylindrical rolls and said reservoirs are braked to achieve preselected tension in said parallel lengths of substantially inextensible material.

5. The product produced in accordance with the method of claim 2.

References Cited

UNITED STATES PATENTS

| | | | |
|---|---|---|---|
| 2,630,603 | 3/1953 | Freedlander et al. | 156—137 |
| 2,700,998 | 2/1955 | Wallace | 156—117 |
| 2,884,044 | 4/1959 | Hulsmit, Jr., et al. | 156—123 |
| 3,122,934 | 3/1964 | Fihe | 156—137 |
| 3,302,680 | 2/1967 | Rote et al. | 156—123 |
| 3,345,228 | 10/1967 | Kovac et al. | 156—123 |
| 3,411,970 | 11/1968 | Perrin | 156—123 |
| 3,081,216 | 3/1963 | Purdy | 156—110 |
| 2,827,099 | 3/1958 | Youngs | 156—110 |
| 2,415,023 | 1/1947 | Novotny | 156—179 |
| 2,001,575 | 5/1935 | James | 156—179 |
| 1,657,818 | 1/1928 | Castricum | 156—177 |
| 1,509,365 | 9/1924 | Midgley | 156—179 |
| 1,339,103 | 5/1920 | Coffey et al. | 156—179 |
| 1,742,777 | 1/1930 | Midgley | 156—179 |
| 3,525,655 | 8/1970 | Wood et al. | 156—123 |

CARL D. QUARFORTH, Primary Examiner

B. HUNT, Assistant Examiner

U.S. Cl. X.R.

156—123, 161, 179, 309, 313, 324